March 21, 1933.     H. L. PALMER     1,902,462
ELECTRICAL CONTROL SYSTEM
Filed Jan. 29, 1931
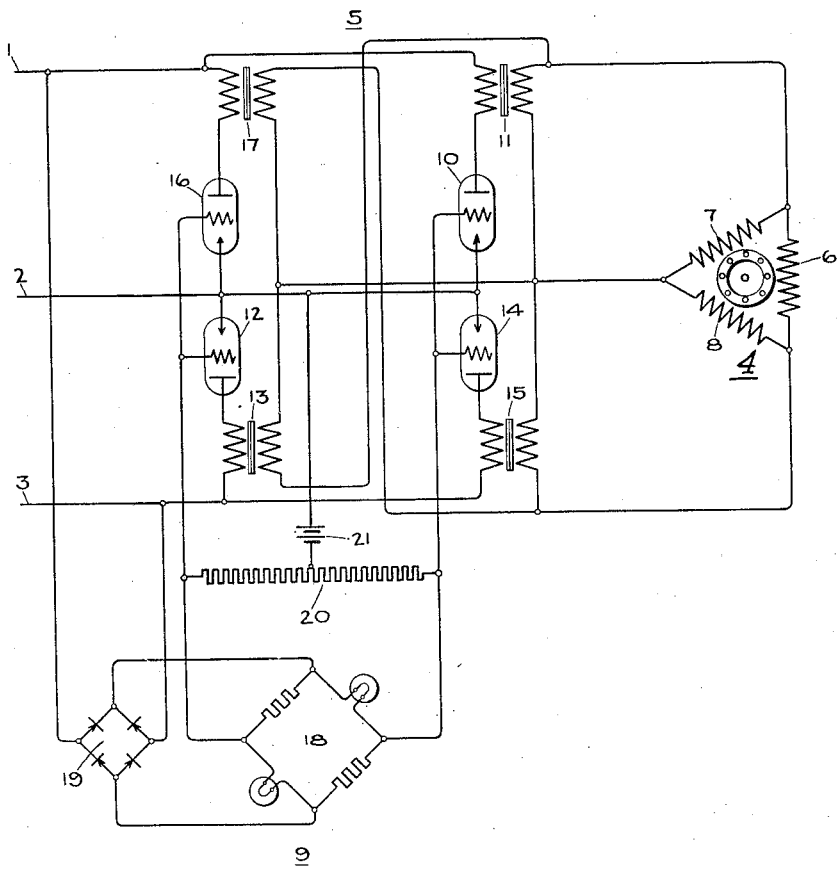
Inventor:
Harry L. Palmer,
by Charles E. Mullan
His Attorney.

Patented Mar. 21, 1933

1,902,462

UNITED STATES PATENT OFFICE

HARRY L. PALMER, OF SCHENECTADY, NEW YORK, ASSIGNOR TO GENERAL ELECTRIC COMPANY, A CORPORATION OF NEW YORK

ELECTRICAL CONTROL SYSTEM

Application filed January 29, 1931. Serial No. 512,102.

My invention relates to electrical control systems and more particularly to static reversing connections for alternating current circuits.

There are many cases where it is desirable to provide reversing connections between a source of current supply and a load. For example, such connections are often used in cases where it is desirable to control the direction of rotation of an electric motor. It is also desirable that such connections be simple and that they involve no moving parts, so that their life and reliability of operation may be as great as possible.

In accordance with my invention I provide a novel system of reversing connections involving electric valves, which is particularly adapted for reversing the phase rotation of a three-phase circuit and which is shown in connection with automatic voltage responsive control means and a reversible three-phase motor, such as may be used in operating an induction feeder voltage regulator.

An object of my invention is to provide a novel electrical control system.

Another object of my invention is to provide a novel static system of reversing connections between a load and a source of supply current.

A further object of my invention is to provide a novel static means for reversing the phase rotation of a three-phase circuit.

An additional object of my invention is to provide novel static voltage responsive means for controlling the direction of rotation of an electric motor.

My invention will be better understood from the following description taken in connection with the accompanying drawing and its scope will be pointed out in the appended claims.

Referring now to the single figure of the accompanying drawing, wherein I have illustrated diagrammatically an embodiment of my invention; a three-phase power supply circuit, represented by conductors 1, 2 and 3, is connected to energize a three-phase motor 4 through my novel static reversing means which is indicated generally by the reference character 5. Motor 4 has been illustrated as a three-phase induction motor having a delta-connected stator composed of windings 6, 7 and 8. The reversing connections 5 are controlled by a grid control circuit arrangement 9, which in the present instance is shown to be automatically responsive to the voltage of the power supply circuit.

Reversing connections 5 are so arranged that phase winding 7 of motor 4 may be connected between conductors 1 and 2 of the power supply circuit by means of a controllable electric valve 10 and a transformer 11, while this phase winding may also be connected between conductors 2 and 3 by means of another controllable electric valve 12 and transformer 13. In a similar manner, valve 14 and transformer 15 connect phase winding 8 between conductors 2 and 3 and valve 16 and transformer 17 connect this same phase winding between power supply conductors 1 and 2. Valves 10, 12, 14 and 16 may either be of the high vacuum pure electron discharge type or of the gas-filled ionization type. The latter type, however, is preferable because of its larger current carrying capacity. As shown, these valves are of the conventional three-element type having anodes connected to the primary windings of their associated transformers, cathodes connected to power supply circuit conductor 2 and intermediate control electrodes or grids which are energized from control circuit arrangement 9. When rendered conducting, these valves are half wave rectifiers, but due to the interposition of the transformers between the phase windings of the motor 4 and these valves this half wave rectified current is converted into full wave alternating current in a manner well understood by those skilled in the art.

It is clear from the above described arrangement that motor 4 will be operated from an open delta source of three-phase power and that the phase rotation of this power supply is reversible depending upon whether valves 10 and 14 are conducting or whether valves 12 and 16 are conducting. However, the above described arrangement may be viewed from another angle. Thus it may be considered that the phase rotation of the power supply to motor 4 is reversed by reversing the connections of phase winding 6 of this motor. As will be seen, this phase winding 6 is connected to the secondary windings of transformers 11 and 15 in series and also to the secondary windings of transformers 13 and 17 which are reversely connected in series. Thus the connections of windings 6 are reversible depending upon whether valves 10 and 14 are conducting or whether valves 12 and 16 are conducting. Furthermore, if valves 12 and 14, for example, are permanently non-conducting, it will be seen that by controlling valves 10 and 16 the phase of the single phase load comprising winding 6 may be reversed with respect to the single phase supply circuit comprising conductors 1 and 2. It should be noted that my invention is not limited to the number of valves and transformers shown, and if desired, full three-phase power instead of open-delta power could be supplied to motor 4, by the addition of two more valves and associated transformers without departing from my invention in its broader aspects.

The control circuit arrangement 9 for the valves may be of any suitable type and in the illustrated embodiment is of the bridge type. It comprises a voltage bridge 18 whose input terminals are energized from conductors 1 and 3 of the power supply circuit through a full wave rectifier 19 which is shown to be of the well known contact type such as rectifiers of the copper oxide type. The output terminals of bridge 18 are connected across a resistance 20 and thence on to the control electrodes or grids of valves 12 and 16 for one terminal and grids of valves 10 and 14 for the other terminal. The electrical midpoint of resistance 20 is connected to power supply conductor 2 through a grid bias battery or other suitable source of voltage 21. The bridge 18 is of a well known construction and comprises four arms which are grouped into pairs of impedance, or resistance, elements having different temperature coefficients of resistance and which are so connected that no two similar elements are adjacent each other. The arms of this bridge are so arranged that when normal voltage is applied to its input terminals the resistance of all four arms is equal so that no voltage appears across its output terminals. However, if the voltage departs from normal in either direction the bridge will become unbalanced and voltages of reversed polarity will appear across the output terminals of this bridge depending upon whether the voltage goes up or down.

The operation of the illustrated embodiment of my invention is as follows: Assume that the power conductors 1, 2 and 3 are energized from any suitable source of three phase alternating current and that the voltage of the three phase supply is normal. Under these conditions bridge 18 will be balanced and no voltage will be impressed across the terminals of resistance 20. The grids of the electric valves will be negatively charged due to the action of bias battery 21 and all four valves will be non-conducting. Consequently motor 4 will be at rest. Assume now that the voltage of power supply circuit 1, 2, 3 decreases. This will cause an unbalance in the bridge circuit 18 and a direct current voltage will appear across its output terminals and hence across the terminals of resistance 20. Assume for example that the polarity of this voltage is such that the right hand end of resistance 20 becomes positive while the left hand end becomes negative. As soon as the positive voltage applied to the right hand end of resistance 20, and which is consequently also applied to the grids of valves 10 and 14, becomes sufficient to overcome the negative bias already supplied to these grids, the valves 10 and 14 will become conducting in a manner which is well understood by those skilled in the art. At the same time the negative bias on the grids of valves 12 and 16 will be increased so that these valves remain non-conducting. The result will be that open delta power is supplied to the motor 4 and this motor will at once start to operate in one direction. If now the voltage of the supply circuit should increase above normal, the polarity of the output terminals of bridge 18 would reverse with the result that the grids of valves 12 and 16 would become positive while the grids of valves 10 and 14 would become negative. As a result valves 12 and 16 would become conducting and valves 10 and 14 would become non-conducting with the result that the phase connection of windings 7 and 8 of motor 4 would be reversed and the motor would operate in a reverse direction.

While I have shown and described a particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a three phase alternating current supply circuit, a three phase load, means including a single pair of electric valves for connecting said load to said circuit, means including a single pair of electric valves for connecting said load to said circuit with reversed phase rotation, and means for selectively rendering each pair of valves conductive.

2. In combination, a three phase alternating current supply circuit, a three phase load, a pair of electric valves connected respectively across two of the phases of said supply circuit, a pair of transformers for energizing two of the phases of said load in accordance with the respective currents of said valves, a second pair of electric valves connected respectively across said phases of said circuit, a second pair of transformers for energizing said phases of said load in accordance with the respective currents of said second pair of valves, the relation between said phases of said load and said phases of said circuit being reversed by said second pair of transformers.

3. In combination, a three phase supply circuit, a three phase load, a pair of controllable electric valves connected respectively between two of the conductors of said circuit and the third conductor thereof, a pair of transformers having their primary windings connected in series respectively with said valves, the secondary windings of said transformers being connected in series between two of the terminals of said load, the common terminal of said secondary windings being connected to the remaining terminal of said load, a second pair of valves and a second pair of transformers connected in the same manner as the first pair of valves and the first pair of transformers except that the connection of the series connected secondary windings to the first mentioned pair of terminals of said load is reversed, and means causing either pair of valves to be conducting while the other pair of valves is non-conducting.

4. In combination, an alternating current circuit, a load winding, an electric valve connected between two of the conductors of said circuit, means for energizing said load winding with alternating current which varies in accordance with the current through said valve, a second electric valve connected between said conductors, means for energizing said load winding with alternating current which varies in accordance with the current through said second valve and which is opposite in phase with respect to the current produced by said first mentioned means, and means for selectively rendering said valves conductive.

5. In combination, an alternating current circuit, a load, a half wave controlled rectifier connected to said circuit, a transformer having its primary winding connected in series with said rectifier and its secondary winding connected to said load, a second half wave controlled rectifier and a second transformer connected in the same way as said first rectifier and first transformer except that said second transformer is reversely connected to said load, and means for causing either rectifier to operate while preventing the other rectifier from operating.

6. In combination, a three phase circuit, a three phase load device having three terminals, means for supplying reversible phase rotation three phase power to said device from said circuit comprising transformers whose secondary windings are connected respectively between different pairs of terminals of said load device, electric valves connected across different phases of said circuit in series respectively with the primary windings of said transformers, additional valves and transformers connected as above except that the secondary windings of said additional transformers are connected so as to reverse the phase rotation of said load, and means for selectively controlling said valves and said additional valves.

In witness whereof I have hereunto set my hand.

HARRY L. PALMER.